United States Patent [19]

Ishiyama

[11] Patent Number: 4,667,962
[45] Date of Patent: May 26, 1987

[54] CHILDREN'S BLOCK TOY
[75] Inventor: Shozo Ishiyama, Tokyo, Japan
[73] Assignee: Kabushiki Kaisha Gakushu Kenkyusha, Tokyo, Japan
[21] Appl. No.: 794,543
[22] Filed: Nov. 4, 1985
[30] Foreign Application Priority Data Nov. 5, 1984 [JP] Japan .............................. 59-166449[U]

[51] Int. Cl.⁴ ........................ A63F 9/12; A63H 33/06
[52] U.S. Cl. .................................. 273/157 R; 446/85
[58] Field of Search ....................... 273/157 R; 446/85
[56] References Cited

U.S. PATENT DOCUMENTS

| D. 156,338 | 12/1949 | Holcomb | 273/157 R X |
|---|---|---|---|
| 756,625 | 4/1904 | Haefele | 446/85 X |
| 1,403,196 | 1/1922 | Rasely | 446/85 |

FOREIGN PATENT DOCUMENTS

| 9939174 | 12/1974 | Japan . | |
|---|---|---|---|
| 3826882 | 8/1982 | Japan . | |
| 592288 | 9/1947 | United Kingdom | 446/85 |

Primary Examiner—Anton O. Oechsle
Attorney, Agent, or Firm—Finnegan, Henderson, Farabow, Garrett & Dunner

[57] ABSTRACT

A block toy including a hexahedral block body having openings of preselected shapes formed in selected surfaces thereof and a block insert having a color contrasting with the color of the block body and being insertable in the block body such that the contrasting color is visible through the openings in the surfaces of the block body.

5 Claims, 7 Drawing Figures

CHILDREN'S BLOCK TOY

FIELD OF THE INVENTION

This invention relates to a children's block toy comprising a plurality of blocks, and more particularly to blocks for enhancing color and shape recognition.

BACKGROUND OF THE INVENTION

In conventional children's block toys, the coloring of concrete objects, digits, patterns, etc., on the blocks is commonly carried out by printing or inserting paint in recesses formed in the blocks. The printing or painting, however, is often troublesome and results in an increase in the cost of manufacturing the blocks. Also, normal usage of the blocks by children causes the colored portions to peel or fade with the result that it becomes difficult to learn color and shape identification through use of the block.

OBJECTS AND SUMMARY OF THE INVENTION

An object of the present invention is a children'block toy for use in learning color and shape identification.

Another object of the present invention is a children's block toy having colored portions that are easy to manufacture.

Still another object of the present invention is a children's block toy have colored portions that do not peel or fade.

A further object of the present invention is an educational children's block toy.

These and other objects are attained by a toy including a block comprising a colored block body having a plurality of surfaces, at least one of the surfaces having an opening therein in a preselected shape, and a block insert having a color contrasting with the color of the block body, the block insert being insertable in the block body such that the color of the block insert is visible through the opening in the block body.

BRIEF DESCRIPTION OF THE DRAWINGS

The manner in which the above objects and other objects, features, and advantages of the present invention are attained will become more apparent from the following detailed description when considered in view of the drawings, wherein.

DETAILED DESCRIPTION

Figure 1:
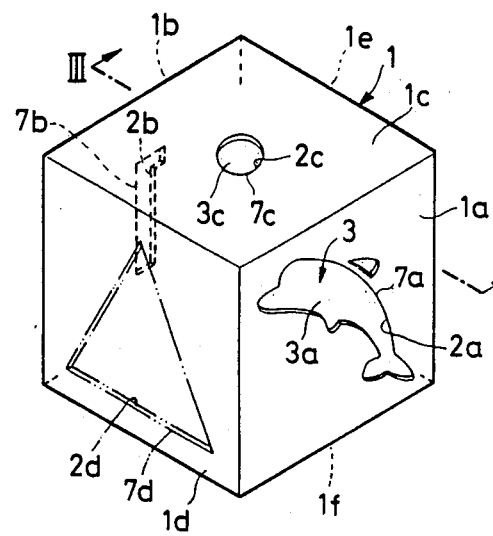
FIG. 1 is a perspective view showing an example of a children's block toy according to one embodiment of the present invention.
Figure 2:
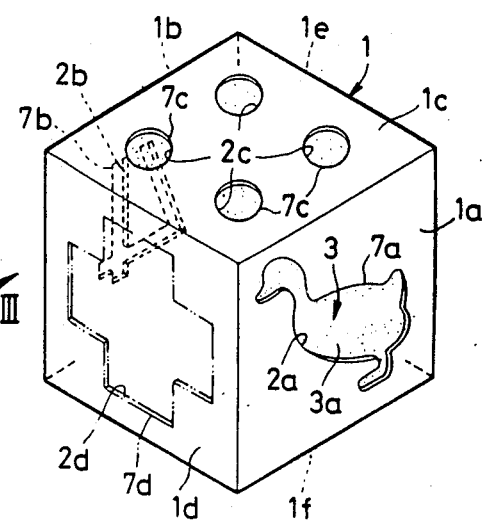
FIG. 2 is a perspective view showing another example of a children's block toy according to another embodiment of the present invention.
Figure 3:
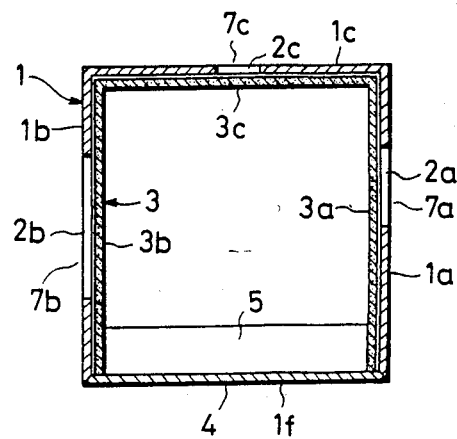
FIG. 3 is a cross sectional view taken along the line III—III of FIG. 1.
Figure 4:
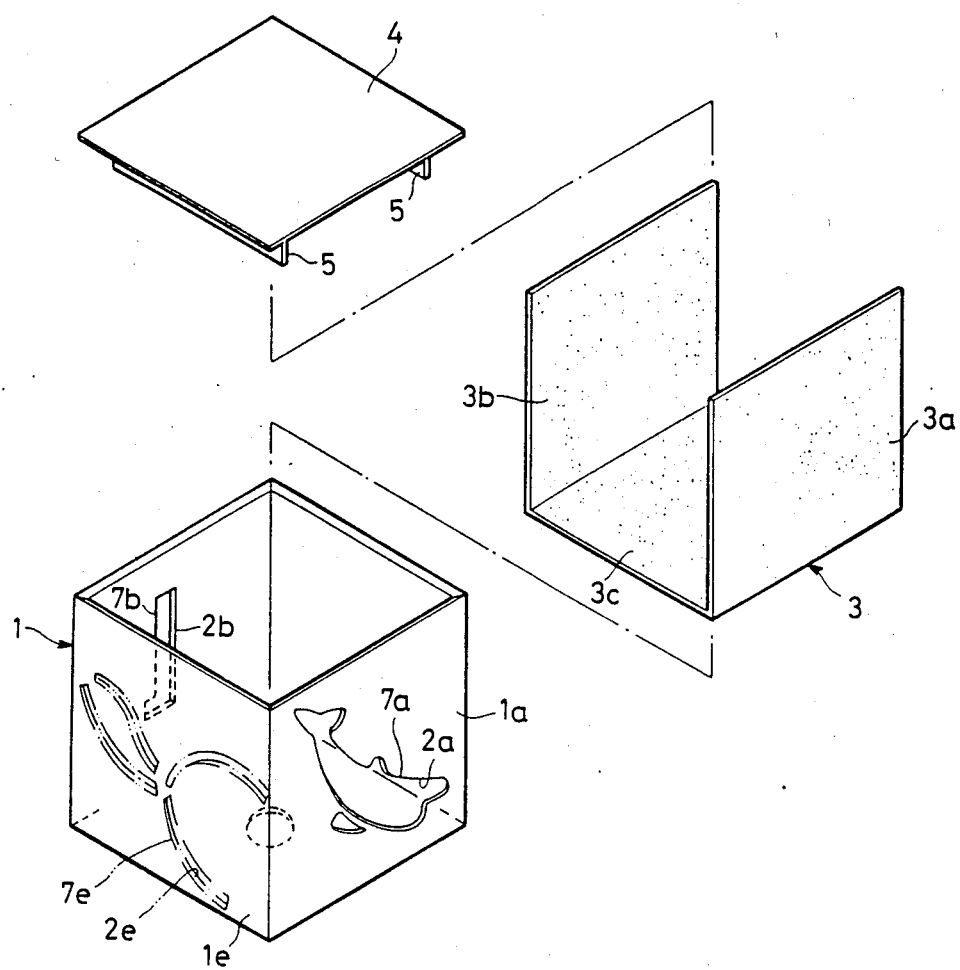
FIG. 4 is an exploded perspective view of the block of FIG. 1.

FIGS. 1 and 2 show typical examples of a children's block according to the present invention. Each block comprises a body 1 having faces 1a, 1b, 1c, 1d, 1e, and 1f. The face 1a may have thereon a picture 7a of a familiar object, like an animal or a vehicle, formed from a stencil cut-out 2a in the face 1a. The face 1b may have a stencil cut-out 2b of a numeral 7b, and the face 1c may have stencil cut-outs 2c of circles 7c or the like equal in number to the numeral 7b. Similarly, the face 1d may include a stencil cut-out 2c of a geometric pattern 7d, e.g., a triangle, cross, etc.

A block liner or insert 3 is provided within the block body 1 such that surfaces 3a, 3b, and 3c of the insert 3 confront corresponding faces 1a, 1b, and 1c of the block body 1. The body 3 is formed in a color contrasting with the color of the block body 1 such that portions of the surfaces 3a, 3b, and 3c are clearly visible within the stencil cut-outs 2a, 2b, and 2c, respectively.

In the preferred embodiment, the insert 3 is formed in a U-shape from synthetic resin by means of known resin molding techniques. Also in the preferred embodiment, the block body comprises a cube open on the face 1f and having a cover 4 placed over the opening 1f. The cover 4 includes legs 5 that may be bonded, for example by adhesive, to the insides of the walls 3a and 3b of the insert 3.

In the above-described embodiment, the stencil cut-outs 2a, 2b, and 2c are cut in three faces 1a, 1b, and 1c of the block body 1. However, other block playing figures may be formed in the other three faces 1d, 1e, and 1f. Furthermore, the block body 1 may include a cut-out 7d or a combining picture 7e in any of the other faces 1d and 1e, to form surface openings 2d or 2e, respectively. A colored insert 3 may be inserted in the block body thus formed.

Figure 5:
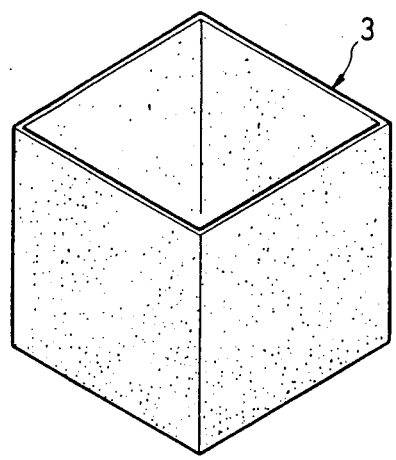
FIG. 5 is a perspective view showing an example of the colored body shown in FIG. 4.
Figure 6:
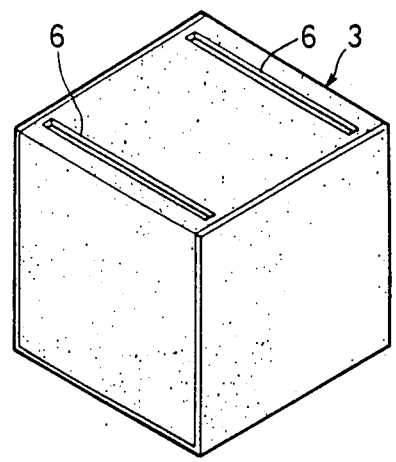
FIG. 6 is a perspective view showing another example of the colored body shown in FIG. 5.

In this case, the colored insert 3 should have three side walls so that a different one of the three side walls confronts each of the surface openings. The colored insert 3 may also have five surfaces as shown in FIG. 5. Alternatively, a colored insert 3 with six surfaces may be formed from two U-shaped colored inserts as shown in FIG. 6. In this case, one surface of the six-surface colored insert 3 includes slits 6 into which the legs 5 of the cover 4 may be inserted.

Figure 7:
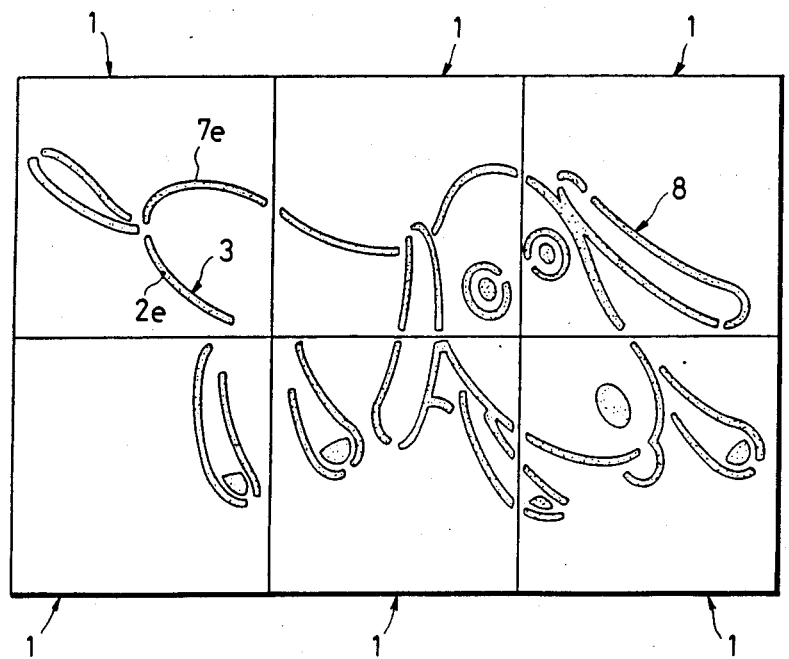
FIG. 7 is an explanatory diagram showing an example of a picture formed by combining children's block toys of the present invention.

FIG. 7 shows the case where a composite animal picture 8 is formed by combining the pictures 7e on the block bodies 1.

In the above-described embodiments, the stencil cut-outs are formed in three to six faces of a block body 1. However, it should be noted that the present invention is not limited thereto or thereby. That is, the stencil cut-outs may be formed in only one or two faces of the block 1 with the colored insert 3 being inserted into the block body 1. In this case, an L-shaped or plate-shaped colored insert 3 may be used.

In the children's block toy according to the present invention, the pictures 7a, digits 7b, etc., are formed in the faces of the block bodies 1. Therefore, the children's block toy can be used for teaching shapes, sizes, numbers, colors, etc., to children by using each block separately or by using the blocks in combination as a type of puzzle. Furthermore, in the children's block toy of the present invention, the stencil cut-outs 2a, 2b, . . . are defined by the colored inserts 3 which are inserted into the block bodies 1 and are different in color from the block bodies 1. In this way, troublesome coloring operations may be eliminated and the manufacturing cost may be made lower than that of conventional blocks that require printing or color-inserting. In addition, since the colored insert 3 is arranged on the inside of each face of the block body 1, even if the blocks are handled in a rough manner, the colored body 3 will not be damaged or worn and the degree of color-fading will be decreased.

What is claimed is:

1. A block toy, comprising:
   a colored block body having a plurality of surfaces and an open end, at least one of said surfaces including a cut-out portion having a preselected shape;
   a U-shaped block insert having two projecting leg portions and a color contrasting with the color of said block body, said block insert being slidably insertable in said block body through said open end such that said color of said block insert is visible through said cut-out portion of said block body and said leg portions of said block insert project toward said open end of said block body; and
   a cover covering said open end of said block body and enclosing said block insert within said block body, said cover including a pair of legs projecting from said cover and engageable with said leg portions of said block insert.

2. A toy according to claim 1, wherein said block body is a hexahedron.

3. A toy according to claim 1, wherein said block body is a cube.

4. A toy according to claim 1 including a plurality of blocks each comprising a block body and a block insert, each of said preselected shape of said opening in each of said blocks comprising a portion of a composite picture, said composite picture being discernible when said blocks are arranged in a predetermined matrix with said surfaces including said portions of said composite picture facing up.

5. A toy according to claim 1, wherein said legs of said cover are bonded by adhesive to said leg portions of said block insert.

* * * * *